Feb. 18, 1958   H. W. RENO ET AL   2,824,204
HEATER ELEMENT SUPPORT
Filed May 23, 1955
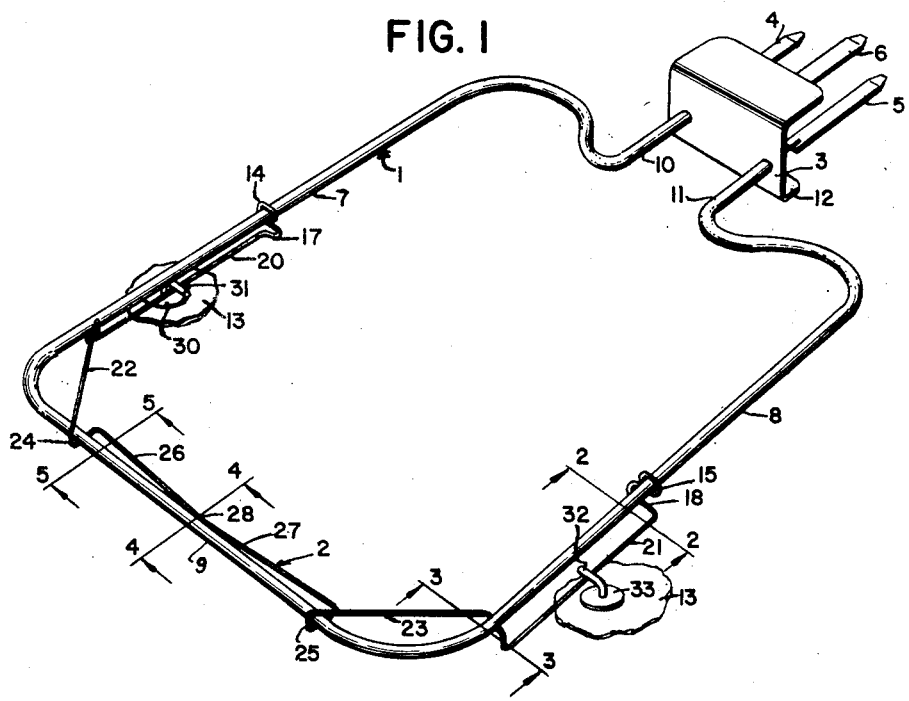
FIG. 1
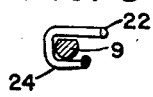   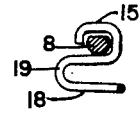
FIG. 5  FIG. 4  FIG. 3  FIG. 2
INVENTOR.
Hugh W. Reno and
BY Elmo E. Aylor United States Patent Office 2,824,204
Patented Feb. 18, 1958

2,824,204

HEATER ELEMENT SUPPORT

Hugh W. Reno and Elmo E. Aylor, Galesburg, Ill., assignors to Midwest Manufacturing Corporation Application May 23, 1955, Serial No. 510,280

11 Claims. (Cl. 219—37)

The present invention relates to an assembly unit for installation in the oven of an electrical range including a heating element and means for supporting the heating element in spaced relation to the bottom wall of the oven. It also relates to an improved support for the side and front end portions of the heating element.

In electrical ranges and particularly in the ovens thereof, if the heating elements are concentrated in a particular area on one or more walls of the oven, it is difficult to maintain a uniform temperature within the oven. In accordance with the present invention, a unit consisting of a heating element and means for supporting the heating element in spaced relation to the bottom wall of the oven is provided for installation in the oven of an electrical range. The heating element is of such shape that when the unit is installed within the oven, all portions of the oven may be maintained at a substantially uniform temperature and the supporting means for the heating element is so constructed and arranged relative to the heating element that portions of the supporting means will rest upon, and will maintain the heating element in spaced relation to, the bottom wall of the oven. Means associated with the supporting means and the bottom wall of the oven are also provided to maintain the assembly unit in place.

It is therefore an object of the present invention to provide an improved assembly unit for installation in the oven of an electrical range including a heating element and supporting means therefor in which the heating element is of such shape that the oven may be heated in a substantially uniform manner when the unit is installed therein and in which portions of the supporting means engage the heating element and other portions rest upon the bottom wall of the oven and maintain the heating element in spaced relation thereto.

Another object of the invention is to provide in an assembly unit including a heating element having oppositely disposed side portions and a front end portion and a support for the side and front end portions of the heating element, which support engages the heating element at a plurality of spaced points and which has a side portion extending downwardly from each of the side portions of the heating element for engagement with the bottom wall of an oven.

A further object of the invention is to provide an improved support for the side and front end portions of a substantially rectangularly shaped heating element, which support has portions for engaging the bottom wall of the oven of an electrical range and portions which engage the heating element at a sufficient number of points thereon to maintain the front and side portions of the heating element in spaced relation to the bottom wall of the oven.

A further object of the invention is to provide in combination with the bottom wall of the oven of an electrical range, a heating element which is substantially rectangular in shape, supporting means for the heating element having portions resting upon the bottom wall of the oven and portions engaging the heating element at a sufficient number of points to maintain the heating element in spaced relation to the bottom wall of the oven, and in which means associated with the bottom wall of the oven and the supporting means are provided for maintaining the support and the heating element in place.

Our invention will be better understood by reference to the accompanying drawings in which:

Fig. 1 is a perspective view of an assembly unit including a heating element and supporting means therefor, and showing fragmentary portions of the bottom wall of an oven and means associated with the bottom wall of the oven and the supporting means for maintaining the assembly unit in place; and Figs. 2, 3, 4 and 5 are cross sectional views taken on planes passing through the lines 2—2, 3—3, 4—4 and 5—5 respectively, of Fig. 1, looking in the direction of the arrows.

The assembly unit of our invention includes a heating element 1, a support for the front and central portions of the heating element designated generally by the numeral 2, a shield 3, spaced prongs 4 and 5, and a locater 6 in the form of a prong which is arranged between prongs 4 and 5, and while we do not desire to be limited to the exact shape of the heating element, as illustrated in Fig. 1 of the drawings, it is substantially rectangular in shape with its free end portions extending through spaced apertures in shield 3 at a short distance from the bottom thereof. As shown in Fig. 1, the ends of the electrical conductor for the heating element protrude from the heating element beyond shield 3 and are electrically connected to the spaced prongs 4 and 5, respectively. The prongs 4 and 5 and the locater 6, which is somewhat longer than prongs 4 and 5, are adapted to be inserted in a suitable outlet plug arranged at the rear end of the oven for supplying electrical energy to the conductor of the heating element in the usual manner.

As shown in Fig. 1 of the drawing, heating element 1 includes side portions 7 and 8, a front end portion 9, and rear end portions 10 and 11 which extend through spaced apertures in the shield 3 at a short distance from the bottom thereof. The lower end of shield 3 is provided with a flange 12 for engaging the bottom wall of the oven to maintain the rear ends of the heating element at a spaced distance therefrom, and release the connector prongs from the weight of the element.

The heating element 1 is comparatively long so that when it is arranged adjacent the bottom wall of the oven 13, which is shown in fragmentary form in Fig. 1, hot air conducted from the heating element will be distributed over the bottom wall of the oven and will rise therefrom to provide a substantially uniform temperature within the oven. In addition to flange 12 of shield 3, a support 2 is therefore provided for the side and front end portions of the heating element.

In accordance with the present invention, the support 2 is connected to the heating element so that the heating element 1, the support 2, the shield 3, and the prongs 4, 5 and 6 may be installed as a single unit in the oven. The support 2 is so arranged relative to the heating element 1 that it serves to support the front and side portions of the heating element from the bottom wall of the oven and engages the inner front edge of the heating element to prevent endwise movement of the support upon the heating element.

As shown in Fig. 1, support 2 is arranged symmetrically relative to heating element 1 and is provided with hooks 14 and 15 at its opposite ends which extend over and below the central portions of the sides 7 and 8, respectively, of the heating element as shown in Fig. 2. Each of the hooks 14 and 15 is then provided with a reverse bend to provide a portion 17 which extends outwardly beyond the side portion 7 of the heating element and a portion 18 which extends outwardly beyond the side portion 8 of the heating element. Each of the portions 17 and 18 of the support then extends downwardly at a spaced distance from the heating element as indicated by the numeral 19 in Fig. 2, and to provide portions which engage the bottom wall of the oven, the support 2 has portions 20 and 21, respectively, which extend longitudinally toward the front end portion of the heating element. Preferably these portions are also disposed outwardly of the element although they may be under it or inwardly of it. To provide an additional portion for engagement with each side of the heating element adjacent its front end, the support at the front end of portions 20 and 21 on the opposite sides of the heating element then extends upwardly beyond each side 7 and 8, respectively, and each has an arcuate portion or shoulder 20' therein as shown in Fig. 3 upon which portions of the heating element rest. To provide additional connections between the support and the heating element and to prevent the support from sliding along the heating element, portions of the support then extend at an angle from the arcuate portions 20' and 21 as indicated by the numerals 22 and 23, the portion 22 being looped around the front end of the heating element at a short distance from the side 7 as indicated by the numeral 24 and as shown more particularly in Fig. 5, and the portion 23 being looped in a similar manner around the front end of the heating element at a short distance from the side 8 as indicated by the numeral 25. Portions 26 and 27 then extend outwardly from the loops 24 and 25, respectively, and merge at a point 28 at which point the support engages the upper edge of the front end 9 as shown in Fig. 4. To provide a strong connection between the hooks 14 and 15 and the heating elements, hooks 14 and 15 may be bent downwardly over the sides of the heating element as shown in Fig. 2 of the drawing.

Means associated with the bottom wall of the oven and portions 20 and 21 of the supports are also provided to maintain the support and the heating element in place. For this purpose, a pair of disks 30 and 31 are provided which may be secured to the bottom wall of the oven in any suitable manner, such as by welding, each of which is provided with an angular shaped prong 32 and 33, respectively, prong 32 being arranged over the portion 20 and prong 33 being arranged over portion 21 of the support 2. The support 2 is preferably in the form of a resilient and flexible wire so that portions 20 and 21 may be readily inserted below prongs 32 and 33, respectively, or if desired, the disks 30 and 31 may be rotatably mounted in the bottom wall of the oven so that the prongs 32 and 33 may be moved over the portions 20 and 21 of the support 2.

Having thus described the invention in an embodiment thereof we are aware that numerous and extensive departures may be made therefrom without departing from the spirit of the invention as defined by the appended claims.

We claim:

1. An assembly unit for installation in the oven of an electrical range, said unit including a substantially rectangularly shaped heating element having side portions, a front portion, and rearwardly extending end portions, and means for supporting the heating element above the bottom wall of the oven, said means including a shield having spaced apertures arranged above its bottom end through which the end portions of the heating element extend and a flange at its lower end for engaging the bottom wall of the oven for supporting the rear end portions of the heating element, and a second support connected to the heating element and having spaced portions for engaging each side portion of the heating element at a position approximating its central portion and at a position in proximity to the front end of the heating element and said second support having a portion engaging the inner side of the front end of the heating element and a pair of downwardly extending portions for engagement with the bottom wall of the oven, one of which is arranged between the points of engagement of the second support with one side portion of the heating element and the other of which is arranged between the points of engagement of the second support with the other side portion of the heating element.

2. An assembly unit for installation in the oven of an electrical range, said unit including a substantially rectangularly shaped heating element having side portions, a front portion and rearwardly extending ends, and means connected to the heating element for supporting the heating element above the bottom wall of an oven, said supporting means including a shield having spaced apertures arranged above its lower end through which the ends of the heating element extend and a flange at its lower end for engaging the bottom wall of the oven for supporting the rear end portion of the heating element and a second support connected to the heating element for engaging the side and front portions of the heating element, said second support having hooked end portions, one of which engages one side portion of the heating element at substantially its central portion and the other of which engages the other side portion of the heating element at substantially its central portion, and said second support having a third portion engaging one side portion of the heating element adjacent its front end, a fourth portion engaging the opposite side portion of the heating element adjacent its front end, and a pair of loops extending around the front end portion of the heating element and a central portion engaging the rear edge of the front portion of the heating element, and said second support being provided with a pair of downwardly extending side portions for engagement with the bottom wall of the oven, one of which extends between the hooked portion at one end of the support and said third portion of said second support which engages said one side portion of the heating element and the other of which extends between the hooked portion at the opposite end of the second support and said fourth portion of said second support which engages the other side portion of the heating element.

3. The combination of a heating element having first and second spaced side portions and a front end portion, and a support for the central and front end portions of said heating element which support engages beneath the heating element at spaced points on each side portion thereof and is provided with a pair of side portions, one of which extends in spaced relation below one side portion of the heating element between its points of engagement with the first side portion of the heating element and the other of which extends in spaced relation below the second side portion of the heating element between the spaced points of its engagement with the second side portion of the heating element.

4. The combination of a heating element having first and second sides and a front end portion, and a support for the sides and front end portion of said heating element which support has hooked end portions, one of which engages the first side of the heating element in proximity to its central portion and the other of which engages the second side of the heating element in proximity to its central portion, and said support having a third portion engaging the first side of the heating element adjacent its front end and a fourth portion engaging the second side of the heating element adjacent its front end, and said support having portions looped around the front end of the heating element and a portion engaging the front end portion of the heating element substantially centrally thereof and a first side portion extending downwardly from the first side of the heating element between one hooked end and said third portion of the support which engages said one side of the heating element and a second side portion which extends downwardly from the second side of the heating element between the other hooked end of the support and said fourth portion of the support which engages the second side of the heating element.

5. A resilient support for the central and front end portions of a heating element having first and second sides and a front end portion, said support having oppositely disposed hooked end portions, one of which is adapted to engage one side of the heating element adjacent its central portion and the other of which is adapted to engage the second side of the heating element adjacent its central portion, and said support having first and second arcuate portions, the first arcuate portion being adapted to engage the first side of the heating element adjacent its front end and the second arcuate portion being adapted to engage the second side portion of the heating element adjacent its front end, and said support having a pair of loops for engaging the front end portion of the heating element, a central portion for engaging the inner edge of the front portion of the heating element, and a pair of downwardly extending side portions, one of which is arranged between one hooked end and the first arcuate portion and the other of which is arranged between the other hooked end and the second arcuate portion.

6. In combination with the bottom wall of the oven of an electrical range, a heating element having side portions and a front portion, a support for the side and front end portions of said heating element consisting of a resilient wire having looped portions extending around the front end portion of said heating element, first and second hooked end portions, one of which engages one side portion of the heating element at approximately its mid portion and the other of which engages the other side portion of the heating element at approximately its mid portion and said support being provided with first and second arcuate portions for engaging and supporting the heating element, one of which is spaced from the first hooked end portion and engages the first side portion of the heating element adjacent its front end and the other of which is spaced from the second hooked end portion of said support and engages the second side portion of the heating element adjacent its front end, and said support being provided with side portions, one of which extends downwardly from the first side portion of the heating element between the first hooked end portion and the first arcuate portion and the other of which extends downwardly from the second side portion of the heating element between the second hooked end portion and the second arcuate portion, and means associated with the bottom wall of said oven and the side portions of said support for maintaining the support in engagement with the bottom wall of the oven.

7. In combination, an electrical heating element having spaced sides, and a support for said heating element, said support having a first pair of upwardly facing shoulders upon which the respective sides of the heating element rest intermediate their respective lengths, said support having opposite side portions connected respectively to said first shoulders and extending forward therefrom in spaced relation below the respective sides of the heating element, said support having a second pair of upwardly facing shoulders connected to said side portions forward from the shoulders of the first pair and upon which the respective sides of the heating element rest, and said support having portions which connect the shoulders and side portion of the support at one side of the heating element to the shoulders and side portion of the support at the other side of the heating element.

8. An assembly unit for installation in an electric oven, said unit comprising an electrical heating element which has spaced sides, and a support attached to said heating element, said support terminating in hook-shaped end portions which overlie the respective sides of the heating element intermediate the respective lengths of said sides, said support having a first pair of upwardly facing shoulders below said end portions upon which the respective sides of the heating element rest, said support having opposite side portions connected respectively to said first shoulders and extending forward therefrom in spaced relation below the sides of the heating element for engagement with the bottom wall of the oven, said support having a second pair of upwardly facing shoulders connected to the forward ends of said side portions of the support and upon which the respective sides of the heating element rest adjacent their front ends, and said support having portions which interconnect the shoulders of the second pair.

9. The combination of an electrical heating element having side and front portions, and a support for said heating element comprising a first portion which presents an upwardly facing shoulder on which the side portion of the heating element rests, and a second portion connected to said first portion and extending beneath the front portion of the heating element in engagement therewith, said second portion having a front segment which extends contiguous to the front of said front portion of the heating element and a back segment which engages the back of said front portion of the heating element.

10. The combination of an electrical heating element having side and front portions, and a support for said heating element comprising a first portion which presents an upwardly facing shoulder on which the side portion of the heating element rests, and a second portion which extends forward from said shoulder across the top of said front portion of the heating element and thence down contiguously across the front of said front portion of the heating element and thence back beneath said front portion of the heating element in engagement therewith and thence at an angle forward and away from said side portion of the heating element into engagement with the back of said front portion of the heating element.

11. In combination, an electrical heating element having spaced sides and a front portion, and a support for said heating element, said support having a first pair of upwardly facing shoulders upon which the respective sides of the heating element rest intermediate their respective lengths, said support having side portions connected respectively to said first shoulders and extending forward therefrom in spaced relation below the respective sides of the heating element, said support having a second pair of upwardly facing shoulders connected to said side portions forward from the shoulders of the first pair and upon which the respective sides of the heating element rest, and said support having interconnected portions connected respectively to the shoulders of said second pair which extend beneath said front portion of the heating element in engagement therewith at spaced locations thereon and which extend contiguous to the front and back of said front portion of the heating element.

References Cited in the file of this patent

UNITED STATES PATENTS

| | | |
|---|---|---|
| 2,226,781 | Rutenber | Dec. 31, 1940 |
| 2,668,222 | McCormick | Feb. 2, 1954 |
| 2,762,899 | Lenz | Sept. 11, 1956 |